(12) United States Patent
Liu

(10) Patent No.: US 9,079,348 B2
(45) Date of Patent: Jul. 14, 2015

(54) ELECTRICAL ALL-DIMENSIONAL NUMERICAL CONTROL INJECTION MOLDING MACHINE

(76) Inventor: Jun Liu, Deyang (CN)

( * ) Notice: Subject to any disclaimer, the term of this patent is extended or adjusted under 35 U.S.C. 154(b) by 0 days.

(21) Appl. No.: 14/234,408

(22) PCT Filed: Jun. 14, 2012

(86) PCT No.: PCT/CN2012/076937
§ 371 (c)(1),
(2), (4) Date: Jan. 23, 2014

(87) PCT Pub. No.: WO2013/016980
PCT Pub. Date: Feb. 7, 2013

(65) Prior Publication Data
US 2014/0141112 A1 May 22, 2014

(30) Foreign Application Priority Data

Aug. 1, 2011 (CN) .......................... 2011 1 0216570

(51) Int. Cl.
| B29C 45/33 | (2006.01) |
| B29C 45/80 | (2006.01) |
| B29C 45/17 | (2006.01) |
| B29C 45/66 | (2006.01) |
| B29C 45/72 | (2006.01) |

(52) U.S. Cl.
CPC .................. B29C 45/80 (2013.01); B29C 45/17 (2013.01); B29C 45/33 (2013.01); B29C 45/332 (2013.01); B29C 45/66 (2013.01); B29C 45/72 (2013.01); B29C 2045/1792 (2013.01)

(58) Field of Classification Search
CPC .... B29C 45/32; B29C 45/33; B29C 45/0017; B29C 45/0408; B29C 45/07; B29C 45/17; B29C 45/66; B29C 45/72; B29C 45/80; B29C 45/332; B29C 2045/1792
USPC .................................................. 425/167, 330
See application file for complete search history.

(56) References Cited

U.S. PATENT DOCUMENTS

| 3,547,184 | A | * | 12/1970 | Navarro et al. ............... 164/343 |
| 4,208,174 | A | * | 6/1980 | Taricco .......................... 425/78 |
| 4,321,029 | A | * | 3/1982 | Aoki ............................. 425/523 |
| 4,583,933 | A | * | 4/1986 | Woelfel et al. ............... 425/330 |
| 5,253,999 | A | | 10/1993 | Kosuge |

(Continued)

FOREIGN PATENT DOCUMENTS

| CN | 202213119 U | 5/2012 |
| CN | 202213120 U | 5/2012 |
| JP | 2036915 A | 2/1990 |

*Primary Examiner* — Yogendra Gupta
*Assistant Examiner* — Emmanuel S Luk
(74) *Attorney, Agent, or Firm* — Mei & Mark LLP

(57) ABSTRACT

An electric all-dimensional numerical control injection molding machine is applicable to production of injection products with high precision and complex three-dimensional shapes. The machine comprises a machine base, a main board, four sets of electric mould guiding devices, a cross-shaped chute mould assembly, and an injection device assembly. The electric mould guiding devices are mounted on a front face of the machine. A slider mould is disposed in a chute of a cross-shaped mould base, is connected to a shaft of an electric driver, and implements mould opening and closing functions by means of linear movement of the shaft of the electric driver. An injection system of the machine is used for injecting plasticized, fused, and homogenized plastic materials into a mould cavity of the mould.

8 Claims, 3 Drawing Sheets

(56) References Cited

U.S. PATENT DOCUMENTS

| | | | |
|---|---|---|---|
| 6,022,206 A * | 2/2000 | McNutt | 425/77 |
| 6,186,763 B1 * | 2/2001 | Scanlan | 425/195 |
| 7,846,370 B2 * | 12/2010 | Yu | 264/318 |
| 8,047,833 B2 * | 11/2011 | Chang | 425/330 |
| 8,523,550 B2 * | 9/2013 | Wehrli et al. | 425/78 |
| 2005/0179155 A1 * | 8/2005 | Yamazaki et al. | 264/40.1 |
| 2008/0234831 A1 * | 9/2008 | Clarke et al. | 623/23.7 |
| 2011/0045121 A1 * | 2/2011 | Chen | 425/556 |
| 2012/0027577 A1 * | 2/2012 | Takemoto | 415/203 |

* cited by examiner

ELECTRICAL ALL-DIMENSIONAL NUMERICAL CONTROL INJECTION MOLDING MACHINE

This is a §371 Application of Application No. PCT/CN2012/076937, filed Jun. 14, 2012, and claim the benefit of Chinese Application No. 20110216570.0, filed Aug. 1, 2011, all of which are incorporated herein by reference.

TECHNICAL FIELD OF THE INVENTION

The invention relates to an injection molding machine and, particularly an electric all-dimensional numerical control injection molding machine which is driven with electric power, may rapidly open and close a mould, and is adaptable for production of plastic products with high precision and complex structures.

TECHNICAL BACKGROUND OF THE INVENTION

Plastic is a novel structural material used extensively in various sectors of a national economy in today's world and people's lives. With economic development, the applications of plastic in various fields have been expanded so that enterprises are facing a lot of opportunities. On the other hand, as the structure of plastic products becomes more and more complex; their volume is continuously miniaturized; and their products require almost strict accuracy and appearance as well as the stable production in large quantities, these become a huge challenge for the enterprises.

The injection molding machine in the prior art has two moulds: one is a stationary mould and the other is a movable mould. The movable mould is driven by an oil cylinder to reciprocate along a guide column, implements mould opening and closing functions, and has only one mould opening direction. As the injection molding machine has high productivity and is easy to achieve automation, it is widely used in the production of a plastic part. However, the machine still has many disadvantages, for example, the higher proportion of finished products against wastes, slow production speed, being prone to flash, high cost of manufacturing the mould, high energy consumption, etc. More importantly, it is extremely difficult and extremely high production and tooling costs to produce a small, sophisticated and complex three-dimensional geometry part. On the other hand, currently, various types of the domestic injection molding machines mostly use hydraulic or pneumatic power. Therefore, there are following main problems: (1) complex mechanical structure as well as high use and maintenance costs; (2) tedious installation and dismantlement of the mould; uneasy control of manufacturing and filling speeds of the mould; and too many problems in production stability and product quality; (3) big noise; easy leakage of hydraulic oil; and large impact on environment.

SUMMARY OF THE INVENTION

The objective of the invention is to overcome the above shortcomings of the technique and provide an electric all-dimensional numerical control injection molding machine with advantages of high production rate, simple operation, high efficiency, stable production, high product quality, environmental protection, and low manufacturing and use costs.

The invention adopts the following technical proposals to solve the technical problems: An electric all-dimensional numerical control injection molding machine has one oblique main board and one cross-shaped chute mould assembly mounted on a central hole of the main board; and at least two sets of slider moulds are guided in a chute and implement mould opening and closing actions.

Four sets of electric mould guiding devices take a central line of a central hole of the main board as a symmetric axis, and are arrayed in equiangular order in an angle of 90 degree and mounted on a front face of the main board. A shaft of an electric driver is connected with various slider moulds. The slider mould is disposed in the chute of a cross-shaped mould base and reciprocates and slides linearly in the chute by means of linear movement of the shaft of the electric driver to implement mound opening and closing functions.

An injection system, when the slider mould is in a closing position, is used for injecting a fused plastic material into a mould cavity of the slider mould, and solidified and molded under pressure to form a needed part. One set of sliding rail devices are mounted on a back face of the main board. An injection molding machine assembly is mounted on the sliding rail device and moves forwards and backwards along a sliding rail by means of an electric driver, so as to achieve the purpose that a nozzle on the injection molding machine assembly is tightly against and away from the position of a pouring gate of the mould, and ensure that the nozzle tightly contacts the mould and produces injection pressure closing a fused plastic material.

A control system comprises a device used for inspecting opening and closing positions of the mould, which is realized through the inspection for the position of the shaft of an electric driver.

The mechanical structure of the electric all-dimensional numerical control injection molding machine may conveniently mount, dismantle and adjust the electric driving device, the mould and other relevant components.

When in use, various slider moulds of the electric all-dimensional numerical control injection molding machine close the mould by directly driving the electric driver and based on a set close program; the injection system moves into an injection step; and an injection machine moves forwards along the sliding rail by the action of the electric driver, so that the nozzle on the injection machine is tightly against a pouring gate of the mould. A pressing injection screw, under the action of another electric driving device and with high speed and pressure, injects the fused plastic material in a storage chamber into a mould cavity of the mould through the nozzle, opens the mould based on a set order after the pressure of the material is maintained and the material is cooled, and transports products into a charging barrel through a stripping and blowing mechanism while the next cycle begins. The process is simple, stable and highly efficient.

Various temperature and place sensors in the control system inspect timely the place signals of various components and the temperature signals of the injection system and transmit these signals to the control system. The control system realizes the coordination action among various components and mechanisms of the system based on the program processed in advance.

The invention has the following effects: the electric all-dimensional numerical control injection molding machine greatly improves the production efficiency of injection molding products, facilitates the operation to be simple, safe, highly efficient and environmental protection, increases the production stability and the quality of casing products, lowers the manufacturing cost of the casting products, and is adaptable for production of plastic products with high accuracy and complex geometric shapes. Meanwhile, the injection molding machine is completely driven by electric power, thus lowering the manufacturing and maintenance costs of the apparatus and further improving the accuracy of the products.

DRAWINGS OF THE INVENTION

The features of the invention have been generally described. The drawings of preferable examples of the invention are described with reference, in which.

EMBODIMENTS OF THE INVENTION

Figure 1:
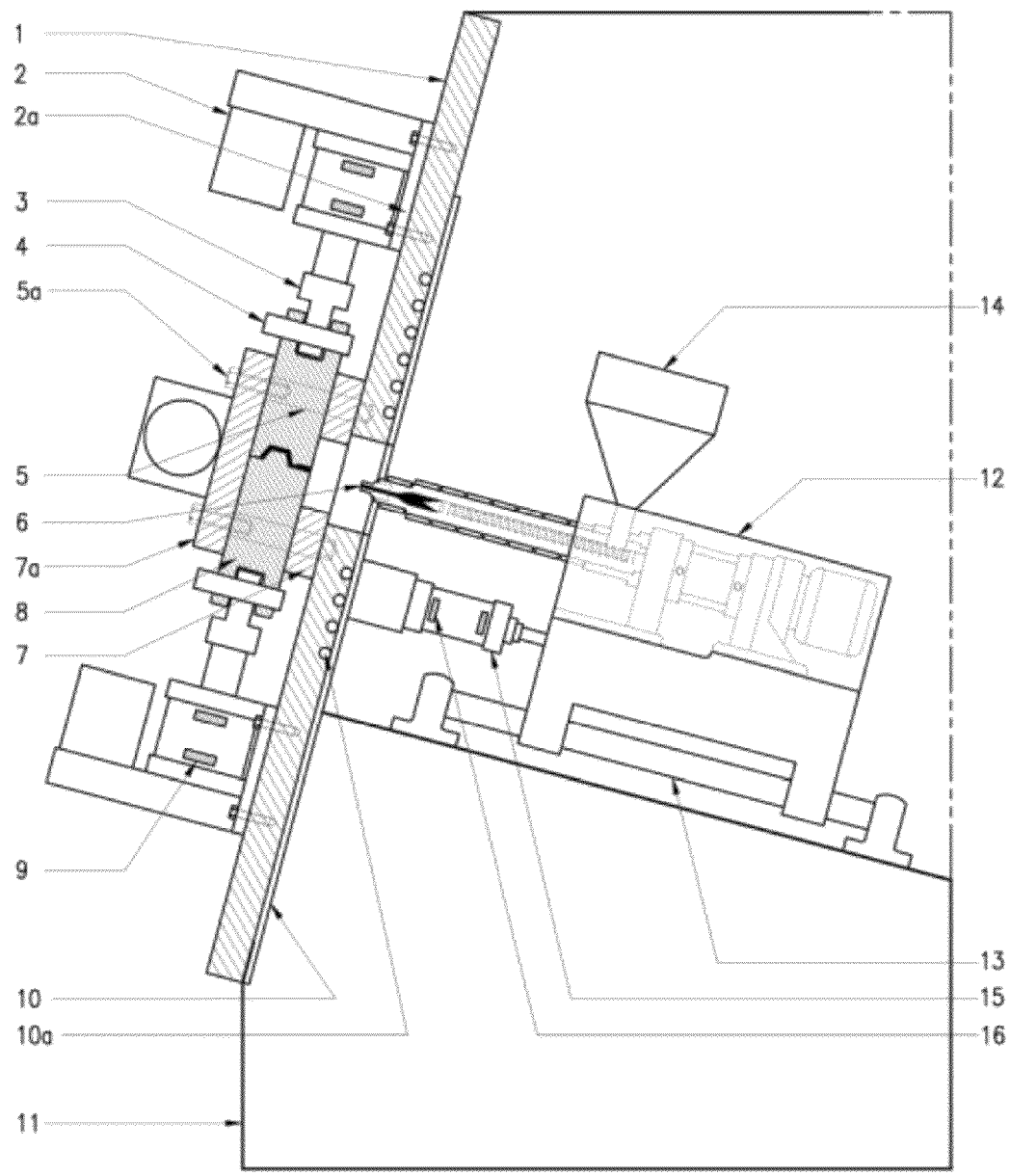
FIG. 1 is a side sectional view of the utility model.

Referred to FIG. 1, the electric all-dimensional numerical control injection molding machine has one machine base body 11 integrally connected with a structure frame and provided with a power and control system therein (which is not required by the utility model and hence only described as an implementation application here.), and one main board. A cooling pipe 10a, mounted on a back face of the main board, is sealed with a cover board 10. The main board 11 is obliquely provided on the machine base body 11. Four sets of the electric mould guiding devices and a chute of a cross-shaped mould base are mounted on a front face of the main board 1.

An injection system is mounted on a back face of the main board 1. The injection system consists of an injection machine assembly 12 (which is not required by the utility model and hence only described as an implementation application here.), a sliding rail device 13 and a displacement electric driver 15. Materials are entered into a material cylinder from a hopper 14 and plasticized, fused, and homogenized by an injection machine. An injection screw, acted by the pushing force of the electric driver in the injection machine and with high speed and pressure, injects fused materials in a storage chamber into a mould cavity of a mould through a nozzle. The fused material is cooled, solidified and sized under pressure.

An injection machine assembly 12 is mounted on the sliding rail device 13, reciprocates along the sliding rail 13 by the action of the displacement electric driver 15, facilitates an injection base to move forwards and backwards, and guarantees an injection molding nozzle to tightly contact with the mould through a central hole of the main board 1 and produce the pressure of the injection base which may seals a fused body.

Figure 2:
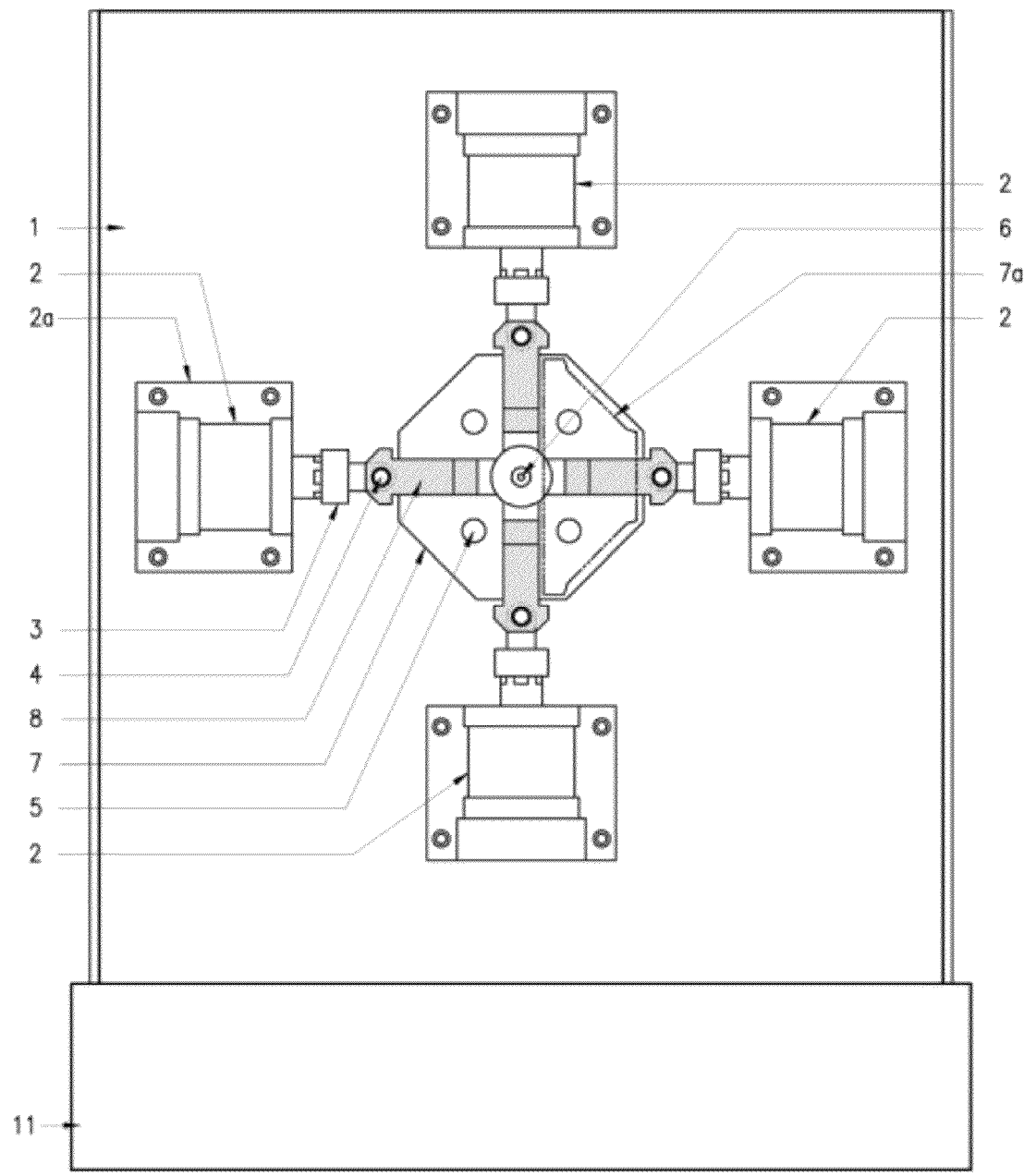
FIG. 2 is a main view that various elements and a mould of an electric mould guiding device mounted on a main board under mould-opening conditions are connected with each other.
Figure 3:
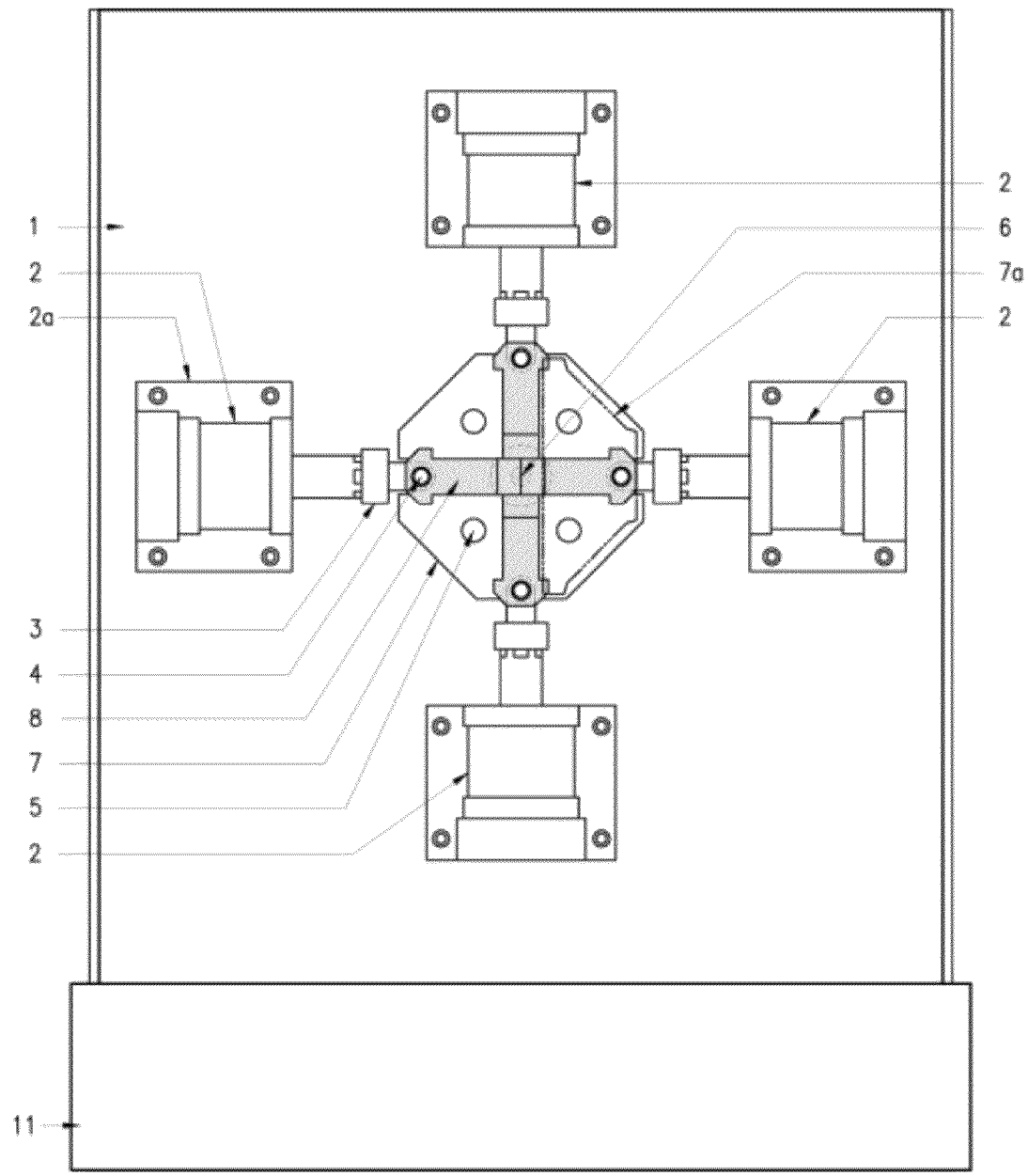
FIG. 3 is a main view that various elements and a mould of an electric mould guiding device mounted on a main board under mould-closing conditions are connected with each other.

FIGS. 2 to 3 show an electric mould guiding device completely mounted. The electric mould guiding device consists of a mounting board 2a, an electric driver 2 and a connecting block 3. Four sets of electric mould guiding devices 2 take a central line of a central hole 6 of the main board 1 as a symmetric axis, and are arrayed in equiangular order in an angle of 90 degree and mounted on a front face of the main board. The chute 7 of the cross-shaped mould base is fixed on the main board 1 through a guide column 5. A slider mould 8 is disposed in the chute 7 of the cross-shaped mould base and connected with a shaft of the corresponding electric driver 2 through the connection block 3 and a PIN connection 4, respectively. A bolt 5a locks the cover board 7a and the chute 7 of the cross-shaped mould base at the main board through the guide column 5, so as to guarantee the accurate sliding position of the slider mould 8. Therefore, the action of the shaft of the electric driver 2 directly drives the slider mould to implement mould opening and closing actions.

A position inspection device 9 is used for inspecting the opening and closing actions of the slider mould. A position inspection device 16 is used for inspecting the forward and backward actions of the injection machine assembly. A signal, received by the position inspection device, is transmitted to a control system of a machine, so as to achieve the control of steps.

When the slider mould reaches the mould-closing position by the action of four sets of the electric mould guiding devices, various electric drivers maintain corresponding pressure to resist the instant expanded pressure produced by the mould cavity during injection, thus facilitating the slider mould to maintain the stable mould-closing conditions all the time and guaranteeing the production of products with right accuracy and high quality.

To sum up, the electric all-dimensional numerical control injection molding machine provided in the invention may be adaptable for the requirements of rapid speed, high pressure, high accuracy, high complexity and high flexibility, thus greatly decreasing the manufacturing and maintenance costs of the apparatus, increasing the production efficiency, production stability and quality of products while decreasing the cost of the injection molding products, and facilitating the operation to be simpler, safer, high efficient and environmental protection.

The above description is only used for illustrating the invention and does not limit the content represented and described here. The details of forms, part arrangement and structures changed based on the creation and features of the invention shall all be within the scope claimed to be protected by the invention.

The invention claimed is:

1. An electric all-dimensional numerical control injection molding machine, comprising:
    a machine base body on which a main board is provided;
    four sets of electric mould guiding devices comprising a central line of a central hole of the main board as a symmetric axis, where the four sets of electric mould guiding devices are arrayed in equiangular order at an angle of 90 degrees and are mounted on a front face of the main board;
    a cross-shaped chute mould assembly erected at the periphery of the central hole of the front face of the main board; and
    an injection device assembly placed on a back face of the main board.

2. The electric all-dimensional numerical control injection molding machine of claim 1, further comprising:
    a cooling system on the main board for decreasing the temperature of the main board,
    four guide columns mounted at the periphery of the central hole of the main board,
    a positioning sleeve and the guide columns positioning and fixing the cross-shaped chute mould assembly on the central hole of the main board,
    a nozzle of the injection device assembly fitted at the central hole of the main board and fitted to a mould carried in a cross-shaped chute mould base.

3. The electric all-dimensional numerical control injection molding machine of claim 1, further comprising:
    a mounting board, an electric driver, and a connecting block for each of the electric mould guiding devices, a respective shaft connected with a respective slider mould for each of the electric drivers, and a chute of a cross-shaped mould base for each of the respective slider moulds, and each respective slider mould is disposed in its respective chute of its respective cross-shaped mould base and reciprocates and slides linearly in the chute by means of linear movement of the respective shafts of the respective electric drivers to implement mould opening and closing functions.

4. The electric all-dimensional numerical control injection molding machine of claim 1, further comprising:

a nozzle on the injection device assembly;

an injection movement system comprising a set of sliding rail devices mounted on the back face of the main board and a sliding rail electric driver; and a pouring gate of the slider moulds, and the injection device assembly is mounted on the sliding rail device and moves forwards and backwards along the sliding rail devices by means of the sliding rail electric driver, and the injection device assembly is configured so that the nozzle on the injection device assembly is selectively moved tightly against and away from the position of the pouring gate of the slider moulds.

5. The electric all-dimensional numerical control injection molding machine of claim 4, further comprising an injection system position inspection device in the injection movement system, and the injection system position inspection device is configured to inspect the sliding actions of the injection device assembly.

6. The electric all-dimensional numerical control injection molding machine of claim 3, further comprising a position inspection device for inspecting respective opening and closing actions of respective slider moulds.

7. The electric all-dimensional numerical control injection molding machine of claim 3, further comprising a mould cavity formed when the respective slider moulds are slid together.

8. The electric all-dimensional numerical control injection molding machine of claim 7, further comprising means to resist expansion pressure, and each electric driver of the electric mould guiding devices resists expansion pressure when an injection operation takes place in the slider moulds.

* * * * *